United States Patent Office 2,848,896
Patented Aug. 26, 1958

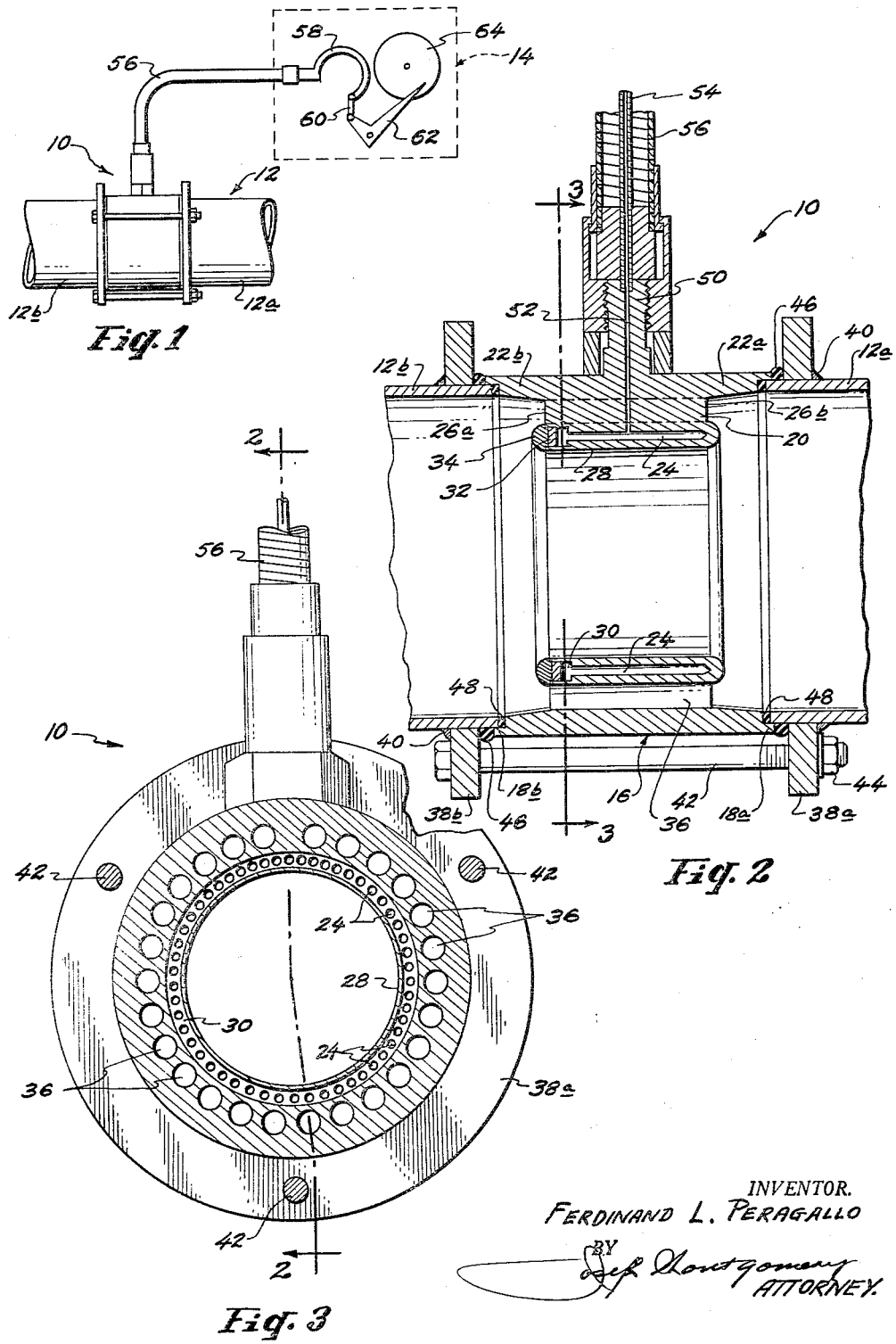

2,848,896

TEMPERATURE SENSING DEVICES

Ferdinand L. Peragallo, Oakland, N. J., assignor to Henze Instrument and Valve Inc., Hoboken, N. J., a corporation of New Jersey Application April 24, 1956, Serial No. 580,230

9 Claims. (Cl. 73—368)

This invention relates generally to temperature sensing devices, and more particularly is directed to improvements in devices for sensing the temperature of a fluid mass within a container.

While the present invention has manifold applications and may take several forms, it will be described in connection with the sensing of the temperature of a fluid within a pipe or the like, for example, as in the pasteurization of milk.

Existing temperature sensing devices for use with milk pasteurizing apparatus usually include a bulb containing a temperature responsive medium extending radially into a pipe of the apparatus, for example, the "holding" tube of a "high temperature-short time" pasteurizing apparatus. Improved temperature sensing devices have been proposed in the applications for United States Letters Patent, Serial No. 504,478, filed April 28, 1955, and Serial No. 535,126, filed September 19, 1955, now Patent No. 2,804,773, by Emil Domingo and Ferdinand L. Peragallo, wherein a cylindrical body having either a continuous annular space or communicating axial bores therein is interposed axially between two sections of the fluid carrying pipe with the inner surface of the cylindrical body being flush with the inner surfaces of the pipe sections so that the inner surface of the pipe is smooth and unobstructed and the temperature variations of the fluid within the pipe are transmitted through the radially inner portion of the cylindrical body to the temperature responsive medium within the annular space or communicating axial bores. Such improved temperature sensing devices are particularly adapted for use in installations wherein place cleaning is to be effected by the circulation of cleaning and sterilizing solutions and sponge scrubbing pads through the pipe system since the pipe system is completely free of any internal obstructions that might impede the movement of the scrubbing pads therethrough. The above described improved temperature sensing devices operate satisfactorily at an imporved rate of response to changes in the temperature of the fluid within the associated pipe line, but in the interest of providing a completely smooth surface and obstruction free interior surface for the pads, heat transfer occurs only at the inner surface of the cylindrical body containing the temperature responsive medium, and there is a demand for a temperature sensing device having an even higher rate of response to such changes in temperature. However, recent developments in chemical cleaning and sterilizing solutions now make it possible to effect the in place cleaning of pipe systems, particularly of milk pasteurizing apparatus, without resorting to the circulation of sponge scrubbing pads therethrough so that, when using such improved solutions, it is no longer necessary to avoid all obstructions within the pipe at the location where the temperature of the fluid is to be sensed.

Accordingly, it is an object of the present invention to provide a temperature sensing device particularly adapted for sensing the temperature of a fluid within a pipe, for example, of milk pasteurizing apparatus, and having a high rate of response to any changes in the temperature of the fluid.

Another object is to provide a temperature sensing device that is reliably operative in any position even when the associated pipe is only partially full of fluid, as distinguished from the usual radially extending bulb which, in the case of a pipe only partly full of fluid, may not be immersed in the latter and therefore may fail to sense the temperature of the fluid.

In accordance with this invention as applied to the sensing of the temperature of a fluid in a pipe line, the above, and other objects, features and advantages thereof appearing in the following detailed description of an illustrative embodiment are achieved by providing a temperature sensing device that includes a cylindrical body having a relatively thick central portion, the inner diameter of which is less than that of the pipe sections between which the device is to be interposed. Axial blind bores are drilled in the thick central portion of the body and open at one end edge of the central portion, with one of the blind bores communicating with a nipple by which that one bore can be connected to a recording thermometer or the like. The end edge of the thick central portion at which the axial blind bores open has an annular groove therein communicating with the several blind bores, and a ring member is welded to the cylindrical body across the annular groove so that the latter and the axial blind bores combine to define a space for containing a temperature responsive medium. Further, in accordance with the present invention, the thick central portion of the cylindrical body has passages extending axially therethrough at locations radially outward with respect to the axial blind bores and opening at the opposite end edges of the thick central portion so that the fluid in the pipe line can flow through such passages, as well as through the relatively large opening defined by the inner cylindrical surface of the central portion, to contact the latter over a large area and thereby provide improved heat transfer to the temperature responsive medium and a correspondingly increased rate of response to any changes in the temperature of the fluid.

In order that the invention may be fully understood, an illustrative embodiment thereof is hereinafter described in detail with reference to the accompanying drawing forming a part hereof, and wherein:

Fig. 1 is a schematic elevational view of a temperature sensing device associated with a pipe line in accordance with the present invention;

Fig. 2 is an enlarged axial sectional view of the temperature sensing device embodying this invention and taken along the line 2—2 of Fig. 3; and Fig. 3 is a transverse sectional view taken along the line 3—3 of Fig. 2.

Referring to the drawing in detail, and initially to Fig. 1 thereof, a temperature sensing device embodying the present invention is there shown and generally identified by the reference numeral 10. The temperature sensing device 10 responds to the temperature of a fluid mass within an associated pipe line 12 and may actuate any conventional temperature indicating means disposed outside of the pipe, or may actuate any conventional device, such as device 14 to which it is connected. The device 14, which may be positioned at a distance from the sensing device 10, can, as shown in the drawing, be a temperature recording instrument providing a continuous written record of the temperature of the fluid mass contained within pipe line 12, or the device 14 may be in the form of a meter visually indicating the temperature or in the form of a control for varying the rate of fluid flow through the pipe line, or some other operating characteristic, in response to changes in the temperature of the fluid mass.

Referring to Figs. 2 and 3 of the drawing, it will there be seen that the temperature sensing device 10, in accordance with this invention, includes a cylindrical body 16 adapted to be interposed between the adjacent ends of pipe sections 12a and 12b included in the pipe line 12 handling a fluid mass. The inner diameter of the cylindrical body 16, at the opposite ends of the latter, is substantially equal to the inner diameter of the pipe sections 12a and 12b, and annular, axially extending rims 18a and 18b are provided at the opposite ends of the body 16 and adapted to telescope over the adjacent ends of the pipe sections 12a and 12b, respectively (Fig. 2).

The cylindrical body 16 further has an annular central portion 20 of substantially reduced inner diameter so that the radial thickness of the central portion 20, which, as shown, extends over a substantial part of the length of body 16, is substantially greater than the thickness of the opposite end portions 22a and 22b of the body (Fig. 2). The relatively thick central portion 20 has a circularly arranged series of axially extending blind bores 24 therein opening at one end face or edge 26a of the central portion disposed radially inside the adjacent end portion 22b, and the blind bores 24 are located closely adjacent to the cylindrical inner surface 28 of central portion 20. Further, the end face or edge 26a has an annular groove 30 therein that opens axially and intercepts the open ends of the blind bores 24. A ring 32 fits into the groove 30 and is held in the latter by a weld 34 in a position spaced from the bottom of the groove into which the bores 24 open so that the groove 30 establishes communication between the several bores 24 and the groove 30 and bores 24 combine to define an internal space within the body 16 that is adapted to contain a temperature responsive medium, for example, a highly volatile fluid.

In accordance with the present invention, the thick central portion 20 of body 16 also has a series of axial passages 36 extending therethrough at locations disposed radially outward with respect to the blind bores 24 and opening at the opposite end faces 26a and 26b of central portion 20 radially inward relative to the end portions 22a and 22b, respectively.

As seen in the drawing, the pipe sections 12a and 12b are held axially together, with the body 16 therebetween, by a coupling structure that may include radial flanges 38a and 38b secured, as by welding 40 or the like, on the outside of the pipe sections 12a and 12b adjacent the confronting ends of the latter, and tie bolts 42 extending axially through aligned openings in the flanges and receiving securing nuts 44 for drawing the flanges 38a and 38b axially toward each other. In order to provide an effective seal between the ends of the pipe sections 12a and 12b and the body 16, sealing rings 46 are interposed between the flanges 38a and 38b and the edges of rims 18a and 18b, respectively, and sealing rings 48 are interposed between the end edges of the pipe sections and the annular shoulders defined at the edges of end portions 22a and 22b within the rims 18a and 18b. Thus, as the nuts 44 are tightened on the bolts 42, the sealing rings 46 and 48 are compressed to prevent any leakage of the fluid mass from the pipe line 12 at the joints between the body 16 of the temperature sensing device 10 and the pipe sections 12a and 12b.

As seen in Fig. 2, an adapter or nipple 50 is welded, or otherwise secured, on the outside of the cylindrical body 16 and has an internal bore 52 communicating, at its inner end, with one of the blind bores 24, and opening, at its outer end, into a capillary tube 54 housed within a suitable flexible conduit 56 and extending from the nipple 50 of the temperature sensing device 10 to the associated recording, indicating or controlling device 14.

As shown schematically on Fig. 1, the device 14 may be a conventional temperature recording mechanism of the kind that generally includes a Bourdon tube 58 connected, at its open, stationary end, to the capillary tube 54 in conduit 56 and, at its other free or movable end, to a linkage 60 attached to a pivoted inking stylus or pen 62 for swinging the latter across a record sheet 64 in response to deflection of the Bourdon tube 58. Such deflection of the Bourdon tube 58 results when the pressure of the temperature responsive medium filling bores 24, groove 30, capillary 54 and Bourdon tube 58 is varied by changes in the temperature of the fluid mass within pipe line 12 transmitted to the temperature responsive medium within the bores 24. If desired, the record sheet 64 may be circular and rotated about its center by a suitable clock-work mechanism so that the line traced on the record sheet by the stylus 62 will represent the temperature of the fluid mass within pipe line 12 as a function of time.

It is apparent that the variations of pressure within the volatile fluid, or other temperature responsive medium in the bores 24, in response to changes in the temperature of a fluid mass flowing through the pipe line 12 can be used merely to indicate the temperature rather than to record the latter, for example, by substituting a pointer for the inking stylus 62 and a suitably calibrated scale for the record sheet 64. Further, it is apparent that the capillary tube 54 may be connected to a diaphragm or bellows arrangement, in place of the Bourdon tube 58, with the diaphragm or bellows being connected to the movable contact of a switch controlling a relay circuit for actuating a valve, signal or the like. Since the present invention only relates to improvements in the temperature sensing device 10, the various known devices that may be substituted for the temperature recording device 14 in association with the device 10 have not been illustrated, and the temperature recording device is to be regarded only as being illustrative of a device that may be associated with a temperature sensing device embodying the present invention.

It is apparent that when the body 16 of temperature sensing device 10 is interposed between pipe section 12a and 12b through which a fluid mass is flowing, the fluid mass will flow along the inner surface 28 of the thick central portion 20 and will also flow through the passages 36 of the latter, thereby to provide a large surface area for heat transfer from the fluid mass through the body 16 to the temperature responsive medium in bores 24. Since the thick central portion 20 of the body 16 presents a restriction to flow through the pipe line 12, the inner surfaces of the end portions 22a and 22b preferably are tapered toward the adjacent end edges of central portion 20 thereby to gradually reduce and increase the interior cross-sectional area to and from, respectively, the central portion 20 and achieve substantially non-turbulent flow of the fluid mass through body 16.

Although the passages 36 through central portion 20 are defined by cylindrical bores in the illustrated embodiment, and such bores are most easily formed with a conventional boring machine, it is to be understood that the passages 36 may have other than circular cross-sections, for example, the portion of the body 16 containing the bores 24 may be spaced radially inward from the remainder of the body 16 by spider arms and the passages 36 will then be defined between such spider arms.

As previously mentioned, the temperature sensing device embodying the present invention may take several forms; it is, therefore, to be understood that instead of the body 16 being circular in cross-section it may be oval or have any other desired cross-sectional formation, and instead of being cylindrical, it may taper generally toward one end thereby to provide a connection between pipe sections of different diameters. It is also to be understood that the body 16 may be semi-cylindrical, or even flat, for example, in a device for sensing the temperature of a fluid mass within a container rather than in a pipe line. When a flat body is employed, it will have a threaded portion adapted to be screwed into a tapped opening in a wall of the container, a plurality of blind bores, corresponding to the bores 24 of the illustrated embodiment, and opening at an edge of the body, a groove in said edge establishing communication between the several blind bores, a nipple extending outwardly from the body and having an internal bore communicating with one of the blind bores, and a series of passages, corresponding to the series of passages 36 of the illustrated embodiment and opening at opposite edges of the flat body so that the fluid mass within the container will fill such passages to improve the heat transfer to the temperature responsive medium in the blind bores and thereby provide a relatively high rate of response to changes in temperature.

All temperature sensing devices embodying the present invention bring the fluid mass into contact with the body having the temperature responsive medium containing blind bores therein at surfaces that are disposed both inwardly and outwardly with respect to the blind bores, and are formed in a way to achieve this desirable circumstance with minimum manufacturing difficulty and expense. Further, the blind bores 24 and passages 36 can be simply formed with a boring or drilling machine.

It is also to be noted that, with the illustrated embodiment of the invention having a circularly arranged series of bores 24 containing the temperature responsive medium, the device 10 can be mounted in any position, that is, the nipple 50 can extend upwardly, as shown, or downwardly or to either side, and changes in the temperature of the fluid mass within pipe line 12 will still be indicated, even when the fluid mass does not completely fill the pipe line. Thus, the temperature sensing device 10 has a flexibility of application that is not shared by existing devices employing a bulb extending radially into a pipe line and wherein the radial bulb must be arranged in a particular position to ensure its immersion in the fluid mass when the latter incompletely fills the pipe line.

Although a particular embodiment of the invention has been described in detail herein and shown in the accompanying drawing, it is to be understood that the invention is not limited to that particular embodiment, and that various changes and modifications may be effected in the latter without departing from the scope or spirit of the invention as defined in the appended claims.

What is claimed is:

1. In combination with a tubular structure including successive pipe sections through which a fluid mass may be passed; a device for sensing the temperature of a fluid mass within said tubular structure comprising an assembly interposed between adjacent ends of said successive pipe sections to form a continuation of said tubular structure, said assembly including a tubular member having a portion of reduced internal diameter with axial internal bores in communication with each other and adapted to contain a temperature responsive medium, said portion of reduced internal diameter further having axial passages extending therethrough at locations disposed radially outward with respect to said internal bores so that the temperature of a fluid mass in said tubular structure is transmitted through said tubular member to the temperature responsive medium in said bores from the fluid mass within said passages as well as in contact with other surfaces of said portion of reduced internal diameter.

2. A device for sensing the temperature of a fluid mass within a walled container; said device comprising a body adapted to be interposed in a wall of the fluid container and having a relatively thick portion to extend inwardly beyond the inner surface of the container wall, said thick portion of the body having a plurality of blind bores extending parallel to each other and the container wall and opening at one edge of said thick portion and disposed adjacent the inner surface of the latter and a groove in said one edge intercepting the open ends of said blind bores, and means in said groove closing the latter so that said groove establishes communication between said bores and said groove and bores define an interior space within said body adapted to contain a temperature responsive medium, said thick portion of the body further having passages extending therethrough parallel to said bores and opening at opposite edges of said thick portion at locations between said bores and the inner surface of the container wall so that any changes in the temperature of a fluid mass within the container are transmitted directly by said thick portion of the body to the medium in said interior space from the fluid mass against said inner surface of the thick portion and within said passages of the latter.

3. A device for sensing the temperature of a fluid mass within a tubular structure that includes successive pipe sections; said device comprising a cylindrical body adapted to be axially interposed between said successive pipe sections to form a continuation of said tubular structure and having a stepped internal configuration to define a relatively thick central portion of reduced internal diameter, said central portion having a circularly arranged series of axial blind bores therein adjacent its inner surface and opening at one end edge of said central portion and an annular groove in said one end edge of the thick central portion intercepting the open ends of said blind bores, and a ring closing said groove at the side of the latter facing away from said bores so that said groove establishes communication between said bores and said groove and bores define an internal space adapted to contain a temperature responsive medium, said thick central portion of the body further having a circularly arranged series of axial through bores opening at the opposite end edges thereof and disposed radially outward with respect to said blind bores so that the fluid mass in said tubular structure enters said through bores and the temperature of the fluid mass against the inner surface of said central portion and within said through bores is transmitted directly by said body to the temperature responsive medium in said internal space.

4. A device as in claim 3; wherein the opposite end portions of said body have inner surfaces tapering in the axial directions toward said thick central portion so that the cross-sectional area within said body is gradually decreased and increased to and from, respectively, said central portion of the body to ensure non-turbulent flow of the fluid mass through the latter.

5. In combination with a tubular structure including successive pipe sections through which a fluid mass may be passed; a device for sensing the temperature of a fluid mass within said tubular structure comprising a tubular body interposed between the adjacent ends of said pipe sections to form a continuation of said tubular structure, said tubular body having a circularly arranged series of axially extending internal bores and means communicating said bores with each other so that said communicating bores are adapted to contain a temperature responsive medium, said body further having a series of axial passages extending therethrough radially outward with respect to said bores and opening, at their opposite ends, into the interior of said tubular body so that the temperature of a fluid mass in said tubular structure is directly transmitted by said body to the temperature responsive medium from the fluid mass against the inner surface of the body and within said passages of the latter.

6. In combination with a tubular structure including successive pipe sections through which a fluid mass may be passed; a device for sensing the temperature of a fluid mass within said tubular structure comprising a tubular member axially interposed between the adjacent ends of said pipe sections to form a continuation of said tubular structure, said tubular member having a thick central portion of reduced internal diameter, said central portion having a circularly arranged series of axial blind bores opening at one end face of said central portion, and a ring member cooperating with said one end face of the central portion to close the open ends of said blind bores and to establish communication between the latter so that said bores define an interior space adapted to contain a temperature responsive medium, said central portion further having a series of axial passages extending therethrough and located radially outward with respect to said bores so that the temperature of a fluid mass against the inner surface of said central portion and within said passages is transmitted directly by said central portion to a temperature responsive medium in said interior space.

7. The combination as in claim 6; wherein said one end face of the central portion has an annular groove therein intercepting the open ends of said blind bores, and said ring member closes the side of said groove facing away from said bores so that said groove establishes the communication between said blind bores.

8. The combination as in claim 6; wherein said tubular member has a radial outlet bore opening, at one end, into said interior space and adapted to be connected, at its other end, to a device responsive to temperature changes in the fluid mass.

9. The combination as in claim 6; wherein said central portion has a circularly arranged series of open-ended cylindrical bores parallel to said blind bores and defining said passages extending through the central portion.

References Cited in the file of this patent

UNITED STATES PATENTS

| | | |
|---|---|---|
| 1,276,024 | Brittin | Aug. 20, 1918 |
| 1,985,733 | Koester | Dec. 25, 1933 |
| 2,025,617 | Schramm | Dec. 24, 1935 |
| 2,328,406 | Atchison | Aug. 31, 1943 |
| 2,756,596 | Nelson et al. | July 31, 1956 |